US011910785B2

(12) United States Patent
Li

(10) Patent No.: US 11,910,785 B2
(45) Date of Patent: Feb. 27, 2024

(54) AUTOMATIC FEEDING DEVICE FOR POULTRY

(71) Applicant: Xiong Li, Xiantao (CN)

(72) Inventor: Xiong Li, Xiantao (CN)

( * ) Notice: Subject to any disclaimer, the term of this patent is extended or adjusted under 35 U.S.C. 154(b) by 0 days.

(21) Appl. No.: 18/458,958

(22) Filed: Aug. 30, 2023

(65) Prior Publication Data

US 2023/0404043 A1  Dec. 21, 2023

(30) Foreign Application Priority Data

Jul. 5, 2023 (CN) .......................... 202321752250.1

(51) Int. Cl.
*A01K 39/01* (2006.01)
*A01K 39/014* (2006.01)

(52) U.S. Cl.
CPC ........ *A01K 39/0113* (2013.01); *A01K 39/014* (2013.01)

(58) Field of Classification Search
None
See application file for complete search history.

(56) References Cited

U.S. PATENT DOCUMENTS

2007/0227453 A1\* 10/2007 Puckett .................. A01K 61/02
119/57.8

FOREIGN PATENT DOCUMENTS

| CN | 107410089 A | 12/2017 |
| CN | 207383268 U | 5/2018 |
| CN | 209693759 U | 11/2019 |
| CN | 212035442 U | 12/2020 |

\* cited by examiner

*Primary Examiner* — Joshua J Michener
*Assistant Examiner* — Henry Hooper Mudd

(57) ABSTRACT

The application discloses an automatic feeding device for poultry. The automatic feeding device poultry comprises a holding barrel and a feeding port; the holding barrel is provided with an accommodating cavity capable of being used for accommodating feedstuff, and a side surface of the holding barrel is provided with an installing hole, the installing hole is communicated with the accommodating cavity; the feeding port is installed in the installing hole, an input end of the feeding port faces downwards and hangs in the accommodating cavity, and an output end of the feeding port extends outwards out of the holding barrel. By arranging the feeding port, the feedstuff is injected into the accommodating cavity and is automatically squeezed to the output end under the action of gravity when in use, so that the feedstuff is eaten by poultry, and does not need to be scattered on the ground.

5 Claims, 3 Drawing Sheets

AUTOMATIC FEEDING DEVICE FOR POULTRY

CROSS REFERENCE TO RELATED APPLICATIONS

This application claims foreign priority of Chinese Patent Application No. 202321752250.1, filed on Jul. 5, 2023 in the China National Intellectual Property Administration, the disclosures of all of which are hereby incorporated by reference.

TECHNICAL FIELD

The application relates to the technical field of feedstuff and water feeding devices, in particular to an automatic feeding device for poultry.

BACKGROUND OF THE PRESENT INVENTION

Poultry refers to artificially-raised birds, mainly for meat, eggs and feathers thereof, or for other purposes. Generally speaking, the poultry refers to phasianidae and anatidae animals, such as chickens, ducks, geese and quails, etc., and other species of birds, such as turkeys, pigeons and various songbirds.

There are four ways to feed poultry: a free-ranging feeding model, a cage feeding model, a flat feeding model and an ecological feeding model. The free-range feeding model is suitable for the poultry to walk freely, and prey on insects and larvae thereof, and forage for grass and grass seeds. The cage feeding model occupies a small space, but limits the feeding space of chickens and is prone to fatigue and other diseases. Through the flat feeding model, the utilization rate of cultivated land is low, but the health problem is difficult to control. The ecological feeding mode can make good use of pond water surface and has strong ecological and economic benefits.

Traditional poultry feeding model is to directly scatter the feedstuff on the ground, and poultry excrement and other filthy things are mixed in the feedstuff, which is very unsanitary. Therefore, a solution is needed to be studied to solve the above problems.

SUMMARY OF PRESENT INVENTION

For this purpose, the application aims at providing an automatic feeding device for poultry in order to solve the problems in the prior art, which is more convenient and sanitary without scattering feedstuff on the ground.

In order to achieve the above purpose, the application adopts the following technical solution:

An automatic feeding device poultry comprises a holding barrel and a feeding port; wherein the holding barrel is provided with an accommodating cavity capable of being used for accommodating feedstuff, a side surface of the holding barrel is provided with an installing hole, the installing hole is communicated with the accommodating cavity; the feeding port is installed in the installing hole, an input end of the feeding port faces downwards and hangs in the accommodating cavity, and an output end of the feeding port extends outwards out of the holding barrel.

As a preferred embodiment, both left and right side surfaces of the holding barrel are provided with the installing hole, correspondingly, two feeding ports are provided and the two feeding ports are respectively installed in the corresponding installing hole.

As a preferred embodiment, the holding barrel comprises a barrel body and a barrel cover, and the barrel cover is arranged at a top of the barrel body and enclosed to form the accommodating cavity.

As a preferred embodiment, a handle is arranged on the barrel body.

As a preferred embodiment, a spacing ring extends radially from the feeding port, the spacing ring abuts against an inner wall surface of the accommodating cavity, and the feeding port is provided with an external thread, the external thread is located outside the spacing ring, a fixing ring is screwed on the external thread, and the fixing ring abuts against an outer wall surface of the holding barrel.

As a preferred embodiment, a sealing ring is clamped between the spacing ring and an inner wall of the accommodating cavity.

As a preferred embodiment, the output end of the feeding port horizontally extends out of the holding barrel.

Compared with the prior art, the application has obvious advantages and beneficial effects. To be specific, the above technical solution is seen as follows:

The feeding port is arranged, the input end of the feeding port faces downwards and hangs in the accommodating cavity, and the output end of the feeding port extends outwards out of the holding barrel. In this way, the feedstuff is injected into the accommodating cavity, and is automatically squeezed to the output end under the action of gravity when the automatic feeding device for poultry is in use, so that the feedstuff is eaten by poultry, and the feedstuff does not need to be scattered on the ground. This way is more convenient and sanitary.

Numeral references:

| | |
|---|---|
| 10 refers to holding barrel | 11 refers to barrel body |
| 12 refers to barrel cover | 13 refers to handle |
| 101 refers to accommodating cavity | 102 refers to installing hole |
| 20 refers to feeding port | 21 refers to input end |
| 22 refers to output end | 23 refers to spacing ring |
| 24 refers to external thread | 31 refers to fixing ring |
| 32 refers to sealing ring | |

DETAILED DESCRIPTION OF PREFERRED EMBODIMENTS

Figure 1:
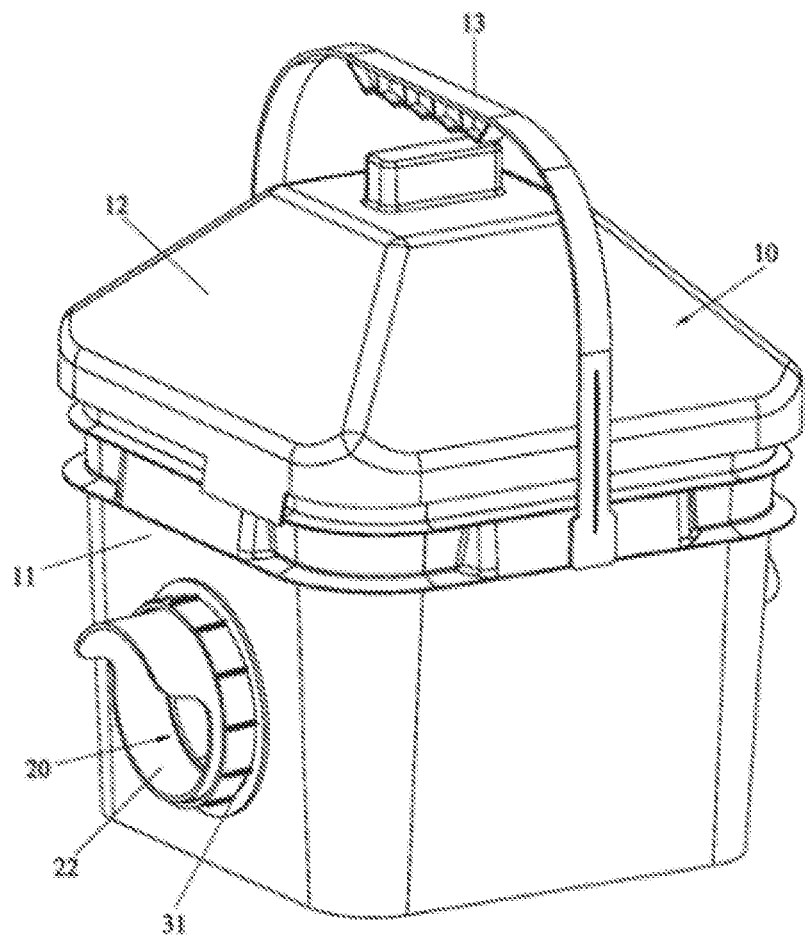
FIG. 1 is a three-dimensional schematic diagram of a preferred embodiment of the application.
Figure 2:
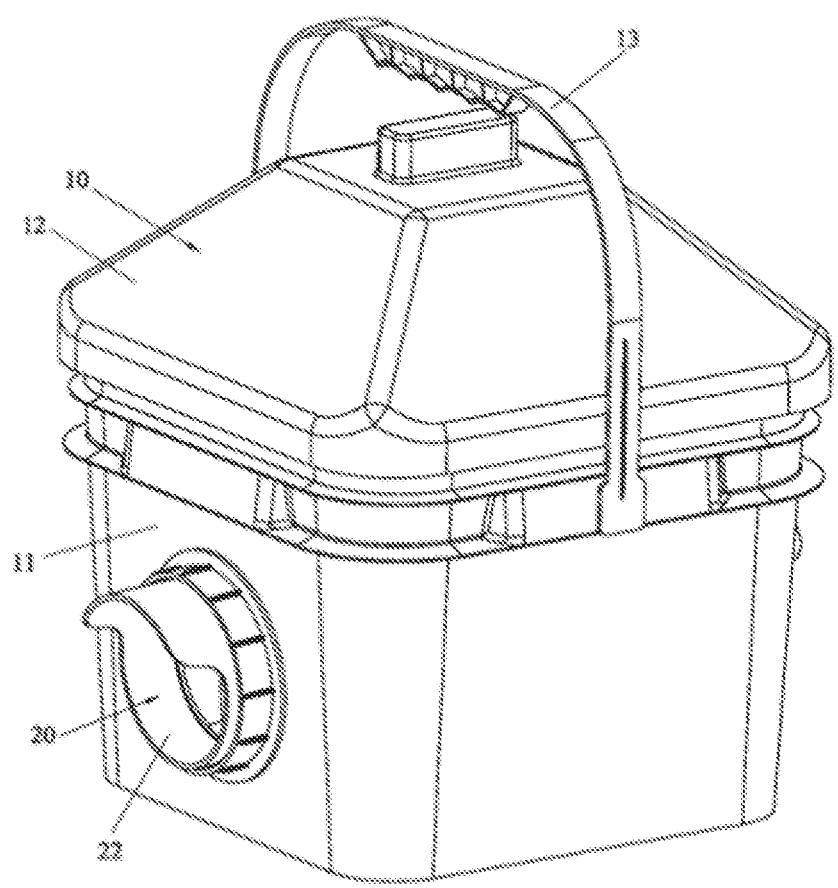
FIG. 2 is a three-dimensional schematic diagram of the preferred embodiment of the application from another view.
Figure 3:
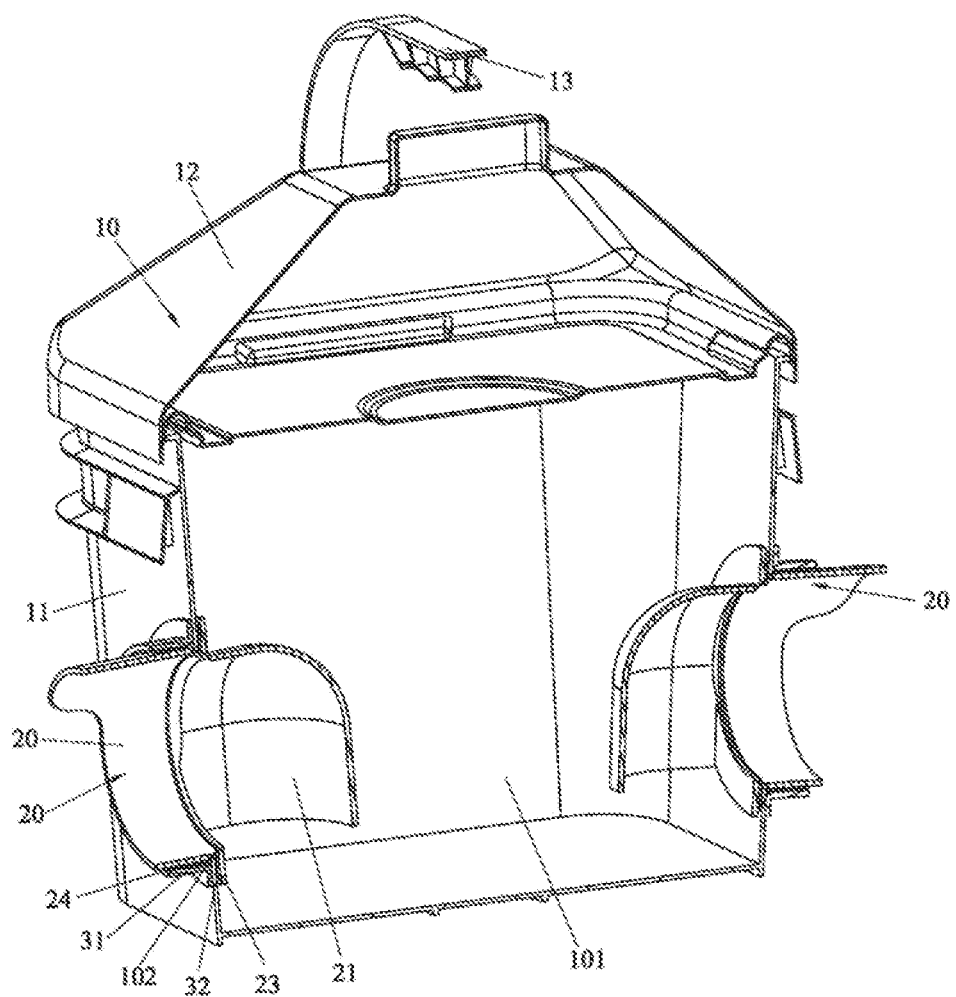
FIG. 3 is a sectional schematic diagram of the preferred embodiment of the application.

FIG. 1 to FIG. 3 show a specific structure of a preferred embodiment of the application, comprising a holding barrel 10 and a feeding port 20.

The holding barrel 10 is provided with an accommodating cavity 101 capable of being used for accommodating feedstuff, and a side surface of the holding barrel 10 is provided with an installing hole 102. The installing hole 102 is communicated with the accommodating cavity 101. Specifically, the holding barrel 10 comprises a barrel body 11 and a barrel cover 12, and the barrel cover 12 is arranged at a top of the barrel body 11 and enclosed to form the accommodating cavity 101. A handle 13 is arranged on the barrel body 11, which is simple in structure and is convenient to use. Moreover, both left and right side surfaces of the holding barrel 10 are provided with the installing hole 102.

The feeding port 20 is installed in the installing hole 102, an input end 21 of the feeding port 20 faces downwards and hangs in the accommodating cavity 101, and an output end 22 of the feeding port 20 extends out of the holding barrel 10. In this embodiment, a spacing ring 23 extends radially from the feeding port 20, the spacing ring 23 abuts against an inner wall surface of the accommodating cavity 101, and the feeding port 20 is provided with an external thread 24. The external thread 24 is located outside the spacing ring 24, a fixing ring 31 is screwed on the external thread 24, and the fixing ring 31 abuts against an outer wall surface of the holding barrel 10, so that the feeding port 20 is detachably installed on the holding barrel 10; and a sealing ring 32 is clamped between the spacing ring 23 and the inner wall of the accommodating cavity 101 to play a role in sealing. In addition, the output end 22 of the feeding port 20 horizontally extends out of the holding barrel 10.

The usage method of this embodiment is detailed as follows:

When in use, the feedstuff is injected into the accommodating cavity 101, and under the action of gravity, the feedstuff is automatically squeezed from the input end 21 to the output end 22, and the feedstuff at the output end 22 is eaten by poultry. After the feedstuff at the output end 22 is eaten, the feedstuff in the accommodating cavity 101 is automatically squeezed from the input end 21 to the output end 22 due to gravity.

The technical principle of the present application is described in conjunction with the above specific embodiments. These descriptions are only for explaining the principle of the present application, and cannot be interpreted to limit the protection scope of the present application in any way. Based on the explanation here, those skilled in the art may think of other specific embodiments of the present application without any creative work, and these embodiments shall all fall within the protection scope of the present application.

I claim:

1. An automatic poultry feeding device, comprising a holding barrel and a feeding port, wherein the holding barrel is provided with an accommodating cavity capable of being used for accommodating feedstuff, a side surface of the holding barrel is provided with an installing hole, the installing hole is communicated with the accommodating cavity, the feeding port is installed in the installing hole, an input end of the feeding port faces downwards and hangs in the accommodating cavity, and an output end of the feeding port extends outwards out of the holding barrel;

wherein a spacing ring is extended radially from the feeding port; the spacing ring is abutted against an inner wall surface of the accommodating cavity; the feeding port is provided with an external thread, the external thread is located outside the spacing ring and around the output end of the feeding port;

a fixing ring is screwed to the external thread, and the fixing ring is abutted against an outer wall surface of the holding barrel;

wherein a sealing ring is clamped between the spacing ring and an inner wall of the accommodating cavity.

2. The automatic poultry feeding device according to claim 1, wherein both left and right side surfaces of the holding barrel are provided with the installing hole, correspondingly, two feeding ports are provided and the two feeding ports are respectively installed in the corresponding installing hole.

3. The automatic poultry feeding device according to claim 1, wherein the holding barrel comprises a barrel body and a barrel cover, and the barrel cover is arranged at a top of the barrel body and enclosed to form the accommodating cavity.

4. The automatic poultry feeding device according to claim 3, wherein a handle is arranged on the barrel body.

5. The automatic poultry feeding device according to claim 1, wherein the output end of the feeding port horizontally extends out of the holding barrel.

* * * * *